(12) United States Patent
Naka et al.

(10) Patent No.: US 11,040,707 B2
(45) Date of Patent: Jun. 22, 2021

(54) BOOSTER OF BRAKING FORCE

(71) Applicant: Robert Bosch GmbH, Stuttgart (DE)

(72) Inventors: Johji Naka, Kanagawa (JP); Yoshiyasu Takasaki, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 352 days.

(21) Appl. No.: 16/084,125

(22) PCT Filed: Mar. 6, 2017

(86) PCT No.: PCT/IB2017/051285
§ 371 (c)(1),
(2) Date: Sep. 11, 2018

(87) PCT Pub. No.: WO2017/158467
PCT Pub. Date: Sep. 21, 2017

(65) Prior Publication Data
US 2020/0290584 A1 Sep. 17, 2020

(30) Foreign Application Priority Data
Mar. 15, 2016 (JP) .............................. JP2016-050702

(51) Int. Cl.
*B60T 13/573* (2006.01)
*B60T 13/00* (2006.01)
(Continued)

(52) U.S. Cl.
CPC ................ *B60T 13/00* (2013.01); *B60T 7/04* (2013.01); *B60T 7/042* (2013.01); *B60T 11/00* (2013.01);
(Continued)

(58) Field of Classification Search
CPC .................................. B60T 7/04; B60T 11/18
See application file for complete search history.

(56) References Cited

U.S. PATENT DOCUMENTS 5,951,117 A * 9/1999 Gautier ................. B60T 13/573
188/356
6,367,886 B1 * 4/2002 Shaw ........................ B60T 7/06
303/3
(Continued)

FOREIGN PATENT DOCUMENTS

CN 110195728 A * 9/2019
DE 19929154 A1 * 12/2000 .............. B60T 7/042
(Continued)

OTHER PUBLICATIONS

International Search Report for Application No. PCT/EP2017/051285 dated Jun. 23, 2017 (English Translation, 2 pages).

*Primary Examiner* — Abiy Teka
*Assistant Examiner* — Matthew Wiblin
(74) *Attorney, Agent, or Firm* — Michael Best & Friedrich LLP

(57) ABSTRACT

There is provided a booster of a braking force 1 which drives a master cylinder by boosting an operation force of a brake pedal 100 in accordance with a movement amount of an input member 4 that reciprocates by an operation of the brake pedal 100, including: the input member 4 of which one end is linked to the brake pedal 100, which is inserted and fitted to the inside of a control housing 3 installed in a housing 2, and which is provided to be freely relatively slidable in an axial direction; and damping members 22, 31, and 32 which are provided at a part at which the input member 4 and the housing 2 abut against each other, or at a position which can be linked or abut against a part of the input member 4, in which, when the input member 4 moves to return when releasing an operation of the brake pedal 100, when the input member 4 abuts against the housing 2, the damping members 22, 31, and 32 perform an impact absorbing and damping action.

9 Claims, 7 Drawing Sheets

(51) Int. Cl.
  B60T 11/00 (2006.01)
  B60T 7/04 (2006.01)
  B60T 11/18 (2006.01)
  B60T 17/00 (2006.01)
  B60T 13/577 (2006.01)
(52) U.S. Cl.
  CPC ............... B60T 11/18 (2013.01); B60T 17/00 (2013.01); *B60T 13/573* (2013.01); *B60T 13/577* (2013.01)

(56) References Cited

U.S. PATENT DOCUMENTS

| | | | |
|---|---|---|---|
| 2002/0121187 A1 | 9/2002 | Schluter | |
| 2011/0297493 A1* | 12/2011 | Vollert | B60T 13/575 188/106 R |
| 2016/0264117 A1* | 9/2016 | Deng | B60L 3/0076 |
| 2020/0017091 A1* | 1/2020 | Bischoff | B60T 11/18 |
| 2020/0282967 A1* | 9/2020 | Sellinger | B60T 11/16 |

FOREIGN PATENT DOCUMENTS

| | | | | |
|---|---|---|---|---|
| EP | 1470980 | | 10/2004 | |
| EP | 1798125 A1 * | | 6/2007 | ............. B60T 11/18 |
| JP | 20148869 | | 1/2014 | |
| JP | 2014008891 A | | 1/2014 | |
| JP | 2014234025 A | | 12/2014 | |
| KR | 20140059666 A * | | 5/2014 | |
| WO | 0112484 | | 2/2001 | |
| WO | 0244000 | | 6/2002 | |

* cited by examiner

BOOSTER OF BRAKING FORCE

BACKGROUND OF THE INVENTION

The present invention relates to a booster of a braking force which drives a master cylinder by boosting an operation force of a brake pedal in accordance with a movement amount of an input member that reciprocates by an operation of the brake pedal, and particularly to a booster of a braking force which suppresses a hammering sound generated by collision of the input member with a housing when releasing the operation of the brake pedal.

As illustrated in JP-A-2014-8869, a booster of a braking force which drives a master cylinder by boosting an operation force of the brake pedal in accordance with the movement amount of the input member that reciprocates by the operation of the brake pedal from the related art, is known. In addition, in the booster of a braking force, a configuration in which an elastic member is interposed in a stopper portion for reducing the hammering sound generated by collision of the input member with a housing when releasing an operation of the brake pedal, is employed.

In other words, in JP-A-2014-8869, when stepping on the brake pedal (connected to a right side of an input rod 34, but not illustrated), by transmission of the force, the input rod 34 and an input piston 32 (which are at a neutral position at which biasing forces of springs 37 and 38 are balanced) integrally move to a left side against the biasing force of a spring 72 in FIG. 1, the movement amount of the input piston 32 is detected by a sensor, and a motor 40 is operated. When the motor 40 is operated, a hydraulic pressure is generated in a primary chamber 16 by pressing a primary piston 10 to a left side by a ball screw mechanism 41 configured of a nut member 46 and a screw shaft 47.

In addition, the hydraulic pressure is transmitted to a secondary chamber 17 via a secondary piston 11, and thus, the brake hydraulic pressure generated in the master cylinder 2 is transmitted to each wheel, and the braking force is generated. Meanwhile, when releasing the braking force of the brake pedal, the input piston 32, the primary piston 10, and the secondary piston 11 restore the movement to the right side in FIG. 1, the brake hydraulic pressure of the master cylinder 2 is reduced, and a braking force is released.

At this time, the input rod 34 restores the movement to the right side, but in FIGS. 2 and 3, even when there is impact when a movable member 92 of a stopper portion 90 abuts against a regulating portion 39 of a housing 4, by an impact absorbing and damping action by which the movable member 92 abuts against a fixing flange 91 via an O ring 93, generation of a hammering sound is reduced by absorbing and damping the impact.

SUMMARY OF THE INVENTION

However, the next problem is generated according to JP-A-2014-8869.

In other words, according to JP-A-2014-8869, it is possible to reduce the hammering sound generated as the input rod 34 retreats and abuts against the regulating portion 39 of the housing 4 when releasing the brake operation, but a return stroke of the input rod 34 is determined by interposing the O ring 93 which is an elastic member, and thus, there is a problem that variation is likely to be generated in the detection of a reciprocating stroke of the input rod 34.

In addition, when variation is generated in the detection of the reciprocating stroke of the input rod 34, there is a possibility that a failure occurs in determination or control of an electric control unit (ECU) in an order of size of variation, and this causes a malfunction of the ECU and a defect accompanying this.

Here, an object of the present invention is to solve the above-described problems of the booster of a braking force of the related art, to be capable of preventing a malfunction or an accompanying failure of an ECU by reducing variation of detection of a reciprocating stroke of an input member, and further, to suppress a hammering sound generated by collision of the input member with a housing when releasing an operation of a brake pedal or the like.

A booster of a braking force of the present invention which drives a master cylinder by boosting an operation force of a brake pedal (100) in accordance with a movement amount of an input member (4) that reciprocates by an operation of the brake pedal (100), includes: the input member (4) of which one end is linked to the brake pedal (100), which is inserted and fitted to the inside of a control housing (3) installed in a housing (2), and which is provided to be freely relatively slidable in an axial direction; and a damping member (22, 31, 32) which is provided at a part at which the input member (4) and the housing (2) abut against each other, or at a position which can be linked or abut against a part of the input member (4), in which after the input member (4) is moved in a first direction (A) by the operation of the brake pedal (100) and gives a braking force to a wheel, when the input member (4) moves to return in a second direction (B) which is reverse to the first direction (A) by a biasing force of a spring (7) provided in the control housing (3) by releasing the operation of the brake pedal (100) so as to abut against the housing (2), the damping member (22, 31, 32) absorbs and damps impact when the input member (4) abuts against the housing (2).

In addition, the damping member is configured of a flexible damper (22) including a bent portion (22e) that is bent or rotates, a first arm portion (22a) that penetrates the input member (4) in an axially orthogonal direction from the bent portion (22e) and extends to be displaceable, and a second arm portion (22b) which extends along the axial direction of the input member (4) from the bent portion (22e).

In addition, a first engaging portion (22d) engaged with a part of the input member (4) may be provided in an intermediate portion of the first arm portion (22a), and a second engaging portion (22c) engaged with a retainer member (21) provided at a part of the control housing (3) or in the control housing (3) may be provided in a tip portion of the first arm portion (22a), and an abutting portion (22f) which exceeds an abutting surface (4b) of the input member (4) by a lever ratio of the first arm portion (22a; that is, a distance between the second and first engaging portions 22d and 22c) and the second arm portion (22b; that is, a distance between the second engaging portion 22c and the abutting portion 22f) and protrudes to the housing (2) side when a relative displacement is generated between the input member (4) and the control housing (3), may be provided in a tip portion of the second arm portion (22b).

In addition, a fulcrum (22g) which is a rotation fulcrum and is engaged with an inner edge portion of an axially orthogonal through hole (4c) formed in the input member (4) may be provided in the middle between the first engaging portion (22d) and the second engaging portion (22c) in the first arm portion (22b).

In addition, the damping member may be configured of a liquid type damper (31) including a cylinder (31a) which is filled with liquid, a piston (31b) which is accommodated in the cylinder (31a), which is provided to be freely slidable in the axial direction, and in which a throttling communication hole (31e) is formed at a part thereof, and a sleeve-like piston rod (31c) of which one end is connected to the piston (31b), and of which the other end passes through one end surface of the cylinder (31a) and extends to a position that opposes an abutting surface (4b) of the input member (4) through an opening portion (2a) of the housing (2).

In addition, a spring (31d) which is provided between the other end surface of the cylinder (31a) and the piston (31b) and which always biases the piston rod (31c) in a protruding direction, may be provided in the fluid type damper (31).

In addition, the damping member may be configured of an electromagnetic damper (32) including a permanent magnet (32a) embedded in an abutting surface (4b) of the input member (4), a solenoid (32b) embedded in an abutted surface (2b) of the housing (2) at a position which opposes the permanent magnet (32a), a power source (32c) which supplies power to the solenoid (32b), a switch (32d) which switches ON and OFF the power source (32c), and an electric circuit (32e) which connects these members, a magnetic force may not be generated between the permanent magnet (32a) and the solenoid (32b) by turning OFF the switch (32d) in a standby state where the brake pedal (100) is not operated, and the magnetic force in a reacting direction may be generated between the permanent magnet (32a) and the solenoid (32b) by turning ON the switch (32d) during an operation of operating the brake pedal (100) and during an operation releasing of releasing the operation of the brake pedal (100).

In addition, a booster of a braking force (1) of the present invention which drives a master cylinder by boosting an operation force of a brake pedal (100) in accordance with a movement amount of an input member (4) that reciprocates by an operation of the brake pedal (100), includes: the input member (4) of which one end is linked to the brake pedal (100), which is inserted and fitted to the inside of a control housing (3) installed in a housing (2), and which is provided to be freely relatively slidable in an axial direction; and a flexible damper (22) including a bent portion (22e) that is bent or rotates, a first arm portion (22a) that penetrates the input member (4) in an axially orthogonal direction from the bent portion (22e) and extends to be displaceable, and a second arm portion (22b) which extends along the axial direction of the input member (4) from the bent portion (22e), as a damping member provided in a state of being linked to a part of the input member (4), in which after the input member (4) is moved in a first direction (A) by the operation of the brake pedal (100) and gives a braking force to a wheel, when the input member (4) moves to return in a second direction (B) which is reverse to the first direction (A) by a biasing force of a spring (7) by releasing the operation of the brake pedal (100) so as to abut against the housing (2), the flexible damper (22) absorbs and damps impact when the input member (4) abuts against the housing (2).

In addition, a first engaging portion (22d) engaged with a part of the input member (4) may be provided in an intermediate portion of the first arm portion (22a), and a second engaging portion (22c) engaged with a retainer member (21) provided at a part of the control housing (3) or in the control housing (3) may be provided in a tip portion of the first arm portion (22a), and an abutting portion (22f) which exceeds an abutting surface (4b) of the input member (4) by a lever ratio of the first arm portion (22a) and the second arm portion (22b) and protrudes to the housing (2) direction when a relative displacement is generated between the input member (4) and the control housing (3), may be provided in a tip portion of the second arm portion (22b).

In addition, a fulcrum (22g) which is a rotation fulcrum and is engaged with an edge of a through hole (4c) formed in the input member (4) may be provided in the middle between the first engaging portion (21d) and the second engaging portion (22c) in the first arm portion (22a).

In addition, a booster of a braking force (1) of the present invention which drives a master cylinder by boosting an operation force of a brake pedal (100) in accordance with a movement amount of an input member (4) that reciprocates by an operation of the brake pedal (100), includes: the input member (4) of which one end is linked to the brake pedal (100), which is inserted and fitted to the inside of a control housing (3) installed in a housing (2), and which is provided to be freely relatively slidable in an axial direction; and a liquid type damper (31) including a cylinder (31a) which is filled with liquid, a piston (31b) which is accommodated in the cylinder (31a), which is provided to be freely slidable in the axial direction, and in which a throttling communication hole (31e) is formed at a part thereof, and a sleeve-like piston rod (31c) of which one end is connected to the piston (31b), and of which the other end passes through one end surface of the cylinder (31a) and extends to a position that opposes an abutting surface (4b) of the input member (4) through an opening portion (2a) of the housing (2), as a damping member provided at a position which can abut against the input member (4), in which after the input member (4) is moved in a first direction (A) by the operation of the brake pedal (100) and gives a braking force to a wheel, when the input member (4) moves to return in a second direction (B) which is reverse to the first direction (A) by a biasing force of a spring (7) provided in the control housing (3) by releasing the operation of the brake pedal (100) so as to abut against the housing (2), the fluid type damper (31) performs an impact absorbing and damping action, and absorbs and damps impact when the input member (4) abuts against the housing (2).

In addition, a spring (31d) which is provided between the other end surface of the cylinder (31a) and the piston (31b) and which always biases the piston rod (31c) in a protruding direction, may be provided in the fluid type damper (31).

In addition, a booster of a braking force (1) of the present invention which drives a master cylinder by boosting an operation force of a brake pedal (100) in accordance with a movement amount of an input member (4) that reciprocates by an operation of the brake pedal (100), includes: the input member (4) of which one end is linked to the brake pedal (100), which is inserted and fitted to the inside of a control housing (3) installed in a housing (2), and which is provided to be freely relatively slidable in an axial direction; and an electromagnetic damper (32) including a permanent magnet (32a) embedded in an abutting surface (4b) of the input member (4), a solenoid (32b) embedded in an abutted surface (2b) of the housing (2) at a position which opposes the permanent magnet (32a), a power source (32c) which supplies power to the solenoid (32b), a switch (32d) which switches ON and OFF the power source (32c), and an electric circuit (32e) which connects these members, as a damping member provided at a part at which the input member (4) and the housing (2) abut against each other, in which a magnetic force may not be generated between the permanent magnet (32a) and the solenoid (32b) by turning OFF the switch (32d) in a standby state where the brake pedal (100) is not operated, the magnetic force in a reacting direction may be generated between the permanent magnet (32a) and the solenoid (32b) by turning ON the switch (32d)

during an operation of operating the brake pedal (100) and during an operation releasing of releasing the operation the brake pedal (100), and after the input member (4) is moved in a first direction (A) by the operation of the brake pedal (100) and gives a braking force to a wheel, when the input member (4) moves to return in a second direction (B) which is reverse to the first direction (A) by a biasing force of a spring (7) provided in the control housing (3) by releasing the operation of the brake pedal (100) so as to abut against the housing (2), the electromagnetic damper (32) absorbs and damps impact when the input member (4) abuts against the housing (2).

According to the booster of a braking force (1) of the present invention, the following effects are achieved.

(1) First, when the damping member is provided between the input member and the housing or the like, and the input member moves to return in the axial direction by releasing the operation of the brake pedal, the damping member absorbs and damps impact when the input member abuts against the housing, and thus, it is also possible to suppress a hammering sound generated by collision of the input member with the housing without deterioration of detection accuracy of a reciprocating stroke of the input member unlike JP-A-2014-8869 of the related art.

In addition, compared to the example of the related art, it is possible to prevent a malfunction or an accompanying failure of an ECU by reducing variation of detection of the reciprocating stroke of the input member.

(2) In addition, in a case where the flexible damper including the fulcrum which is bent or rotates as a damping member, the first arm portion which penetrates the input member from the fulcrum and extends in an axially intersecting direction to be displaceable, and the second arm portion which extends along the axial direction of the input member from the fulcrum, is employed, it is possible to provide a compact and inexpensive damping member by a relatively simple configuration.

In addition, in a case where the first engaging portion engaged with a part of the input member is provided in the intermediate portion of the first arm portion, the second engaging portion engaged with a member attached to a part of the control housing or in the control housing is provided in the tip portion of the first arm portion, and the abutting portion which protrudes further to the housing side than the abutting surface of the input member by a lever ratio of the first arm portion and the second arm portion when a relative displacement is generated between the input member and the control housing, is provided in a tip portion of the second arm portion, the rotation displacement is generated in the first arm portion as the first engaging portion and the second engaging portion abut against the input member or the control housing (including the member attached to the control housing) in order, a bending deformation is generated in the second arm portion as the movement of the first engaging portion is transmitted to the second arm portion via the fulcrum, and the abutting portion of the second arm portion can exceed the tip portion of the input member and can protrude in the housing direction.

In addition, in a case where the fulcrum which is engaged with the edge portion of the axially orthogonal through hole formed in the input member and is a rotation fulcrum is provided in the middle between the first engaging portion and the second engaging portion in the first arm portion, the fulcrum becomes the rotation fulcrum, the first arm portion rotates, and thus, a shift of the first arm portion in the axially intersecting direction and the axial direction during the rotation is prevented, and the rotation displacement of the first arm portion is stabilized.

(3) In addition, in a case where the fluid type damper including the cylinder which is filled with liquid, the piston which is accommodated in the cylinder, which is provided to be freely slidable in the axial direction, and in which a throttling communication hole is formed at a part thereof, and the sleeve-like piston rod of which one end is connected to the piston, and of which the other end passes through one end surface of the cylinder and extends to a position that opposes the abutting surface of the input member, is employed as a damping member, the liquid which fills the inside of the cylinder becomes working liquid and comes and goes to a left chamber and a right chamber separated by the piston through the throttling communication hole, and thus, it is possible to achieve a desirable impact absorbing and damping action by absorbing kinetic energy of the input member by an orifice effect of the throttling communication hole.

In addition, in a case where the spring which always biases the piston rod in the protruding direction between the other end surface of the cylinder and the piston is installed to contract, it is possible to make the piston rod protrude by the biasing force of the spring without additionally providing a hydraulic pressure circuit, and thus, it is possible to provide a compact fluid type damper by a simple structure. In addition, accordingly, it is possible to reduce a load during the collision of the input member.

(4) In addition, in a case where the electromagnetic damper including the permanent magnet embedded in the abutting surface of the input member, the solenoid embedded in an abutted surface of the housing at a position which opposes the permanent magnet, the power source, a switch, and an electric circuit, is employed as a damping member, by generating a magnetic force in the reacting direction between the permanent magnet and the solenoid by turning ON the switch when releasing the operation of the brake pedal, it is possible to absorb and damp the impact when the input member moves to return by the magnetic force, and to extremely efficiently suppress generation of the hammering sound.

In addition, since it is possible to control the magnetic force by adjusting the ON and OFF operations of the switch and the size of the current supplied to the solenoid, it is possible to switch the above-described operation of the switch in accordance with the change in relative position of the input member and the housing, or to gradually increase or decrease the magnetic force. In addition, it is also possible to adjust the size of the magnetic force in accordance with various boosters of a braking force having different impact loads of the input member during the return movement.

DETAILED DESCRIPTION

Hereinafter, a booster of a braking force 1 according to the present invention will be specifically described based on a first embodiment illustrated in FIGS. 1 to 7, a second embodiment illustrated in FIGS. 8 to 10, and a third embodiment illustrated in FIGS. 11 to 13. First, the entire configuration of the booster of a braking force 1 of the present invention will be schematically described based on FIG. 1, and a specific configuration and an operation state of a booster of a braking force 1A according to the first embodiment of the present invention will be described based on FIGS. 1 to 7.

Figure 1:
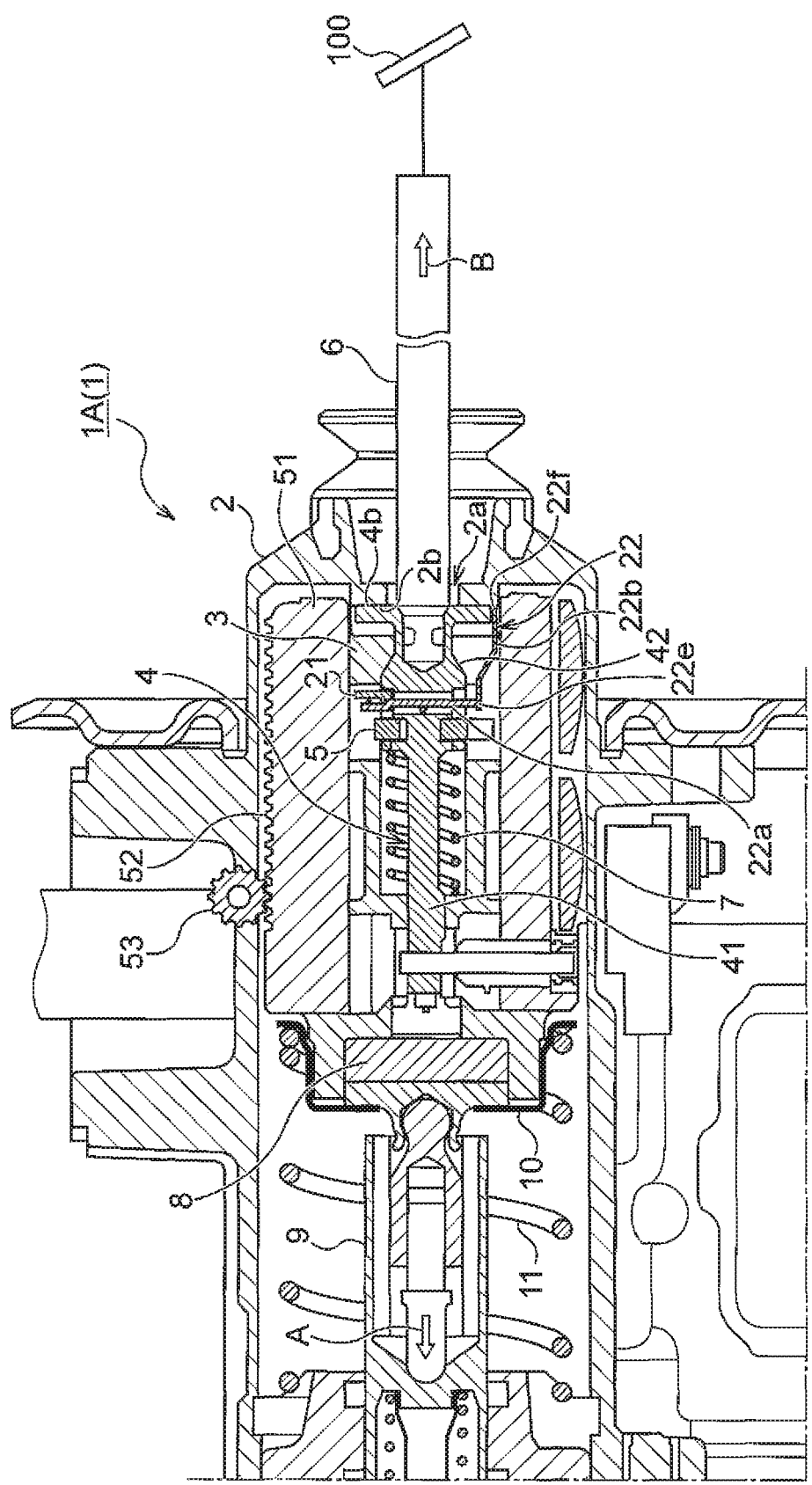
FIG. 1 shows a side sectional view illustrating a booster of a braking force according to a first embodiment of the present invention.

(1) Entire Configuration of Booster of Braking Force (Refer to FIG. 1)

The booster of a braking force 1 of the present invention is a booster of a braking force which drives a master cylinder by boosting an operation force of a brake pedal 100 in accordance with a movement amount of an input member 4 that reciprocates by an operation of the brake pedal 100.

Specifically, the input member 4 linked to the brake pedal 100 via an input rod 6 is provided with a plunger 41 and a linking head 42 which are integrated, inserted and fitted to the inside of a control housing 3 installed in a main housing 2, and provided to be freely relatively slidable in an axial direction. In addition, the input member 4, the plunger 1, and the linking head 42 are the same member. In addition, a damping member (22, 31, 32) which absorbs and damps impact when the input member 4 moves to return and abuts against the housing 2 is provided at a predetermined position, and accordingly, the booster of a braking force 1 of the braking force of the present invention is basically configured.

Figure 2:
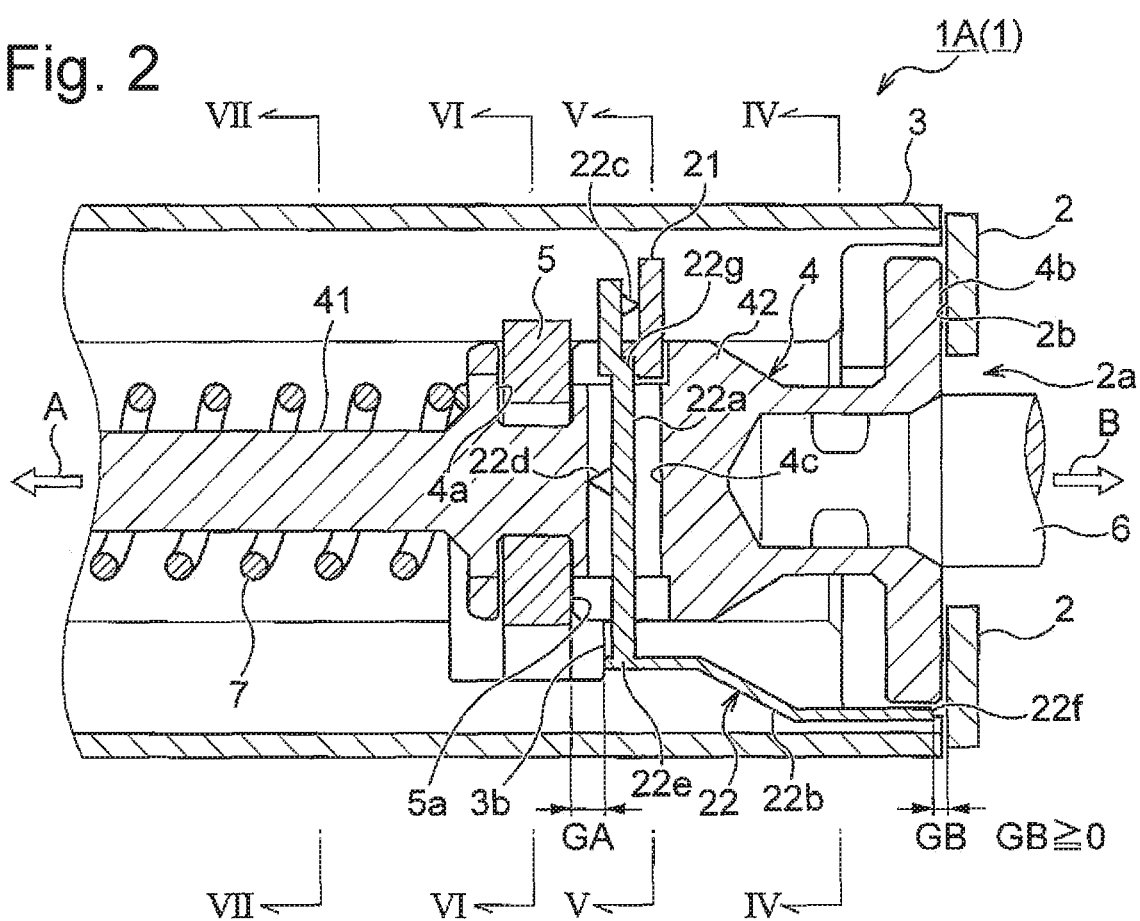
FIG. 2 shows a view illustrating the booster of a braking force according to the first embodiment of the present invention, and is a side sectional view illustrating an operation state of a flexible damper when an input member is positioned at a standby position.

Furthermore, as illustrated in the drawing, the booster of a braking force 1 of the present invention includes keys 5 (refer to FIGS. 2 and 6) which are substantially U-shaped keys 5, which have an axial gap GA (formed between a right side surface 5a in the drawing of the key 5 and a reference surface 3b of the control housing 3, in FIG. 2) with respect to a groove portion 4a formed in the input member 4, and which are engaged with each other in an axially orthogonal direction; a booster main body 51 (integrally has a rack 52 as illustrated in FIG. 1) which moves being integrated with the control housing 3; a pinion gear 53 meshed with the rack 52; a motor which is not illustrated and drives the pinion gear 53; a spring 7 which is installed to contract in the control housing 3, and biases the input member 4 in a return movement direction which becomes a second direction B that will be described later; a reaction disk 8 which is disposed on the same axial line as a tip end of the input member 4; an output member 9 which is linked to the reaction disk 8 and generates an output stroke for driving the master cylinder; a cover 10 which is disposed around the reaction disk 8 to cover the reaction disk 8, and functions as a spring seat; a spring 11 of which one end abuts against a part of the output member 9, of which the other end abuts against the cover 10, and which biases the output member 9 in an operation direction which becomes a first direction A that will be described later; a sensor which is not illustrated and is for detecting a stroke amount of the input member 4, a stroke amount of the booster main body 51 (FIG. 1), a stroke amount of the output member 9, and an output shaft rotation angle of the motor; and a control device which performs a series of controls by sending information obtained by the sensor to an ECU.

In addition, in the present invention, after the input member 4 is moved in the first direction A by the operation of the brake pedal 100 and gives a braking force to a wheel, when the input member 4 moves to return in the second direction B reverse to the first direction A by a biasing force of the spring 7 that is installed to contract in the control housing 3 by releasing the operation of the brake pedal 100, when the input member 4 abuts against the housing 2, the damping members 22, 31, and 32 are configured to absorb and damp impact when the input member 4 abuts against the housing 2.

(2) Specific Configuration of First Embodiment (Refer to FIGS. 1 to 7)

The booster of a braking force 1A according to the first embodiment of the present invention includes the flexible damper 22 (refer to FIGS. 2 and 3) as the damping member, and the flexible damper 22 is made of a flexible material, such as plastic, and includes a bent portion 22e that is bent or rotates, a first arm portion 22a that penetrates the input member 4 in the axially intersecting direction from the bent portion 22e and extends to be displaceable, and a second arm portion 22b which extends along the axial direction of the input member 4 from the bent portion 22e.

In addition, a first engaging projected portion 22d which is a first engaging portion engaged with a part of the input member 4 is provided in an intermediate portion of the first arm portion 22a, and a second engaging projected portion 22c which is a second engaging portion engaged with a retainer 21 attached to the control housing 3 is provided in a tip portion of the first arm portion 22a.

In addition, an abutting portion 22f which exceeds an abutting surface 4b that is a right side end surface of the input member 4 to a right side of the drawing by a lever ratio (that is, a ratio between a distance between the second and first engaging portions 22d and 22c and a distance between the second engaging portion 22c and the abutting portion 22f) of the first arm portion 22a and the second arm portion 22b and protrudes to the housing 2 side when a relative displacement is generated between the input member 4 and the control housing 3, is provided in a tip portion of the second arm portion 22b.

Figure 5:
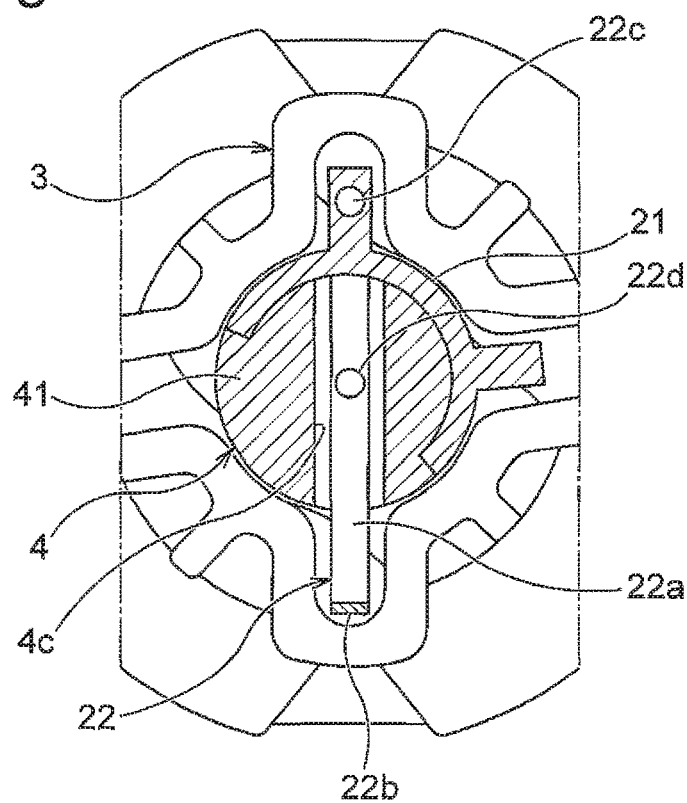
FIG. 5 shows a view illustrating the booster of a braking force according to the first embodiment of the present invention, and is a sectional view taken along line V-V of FIG. 2.
Figure 6:
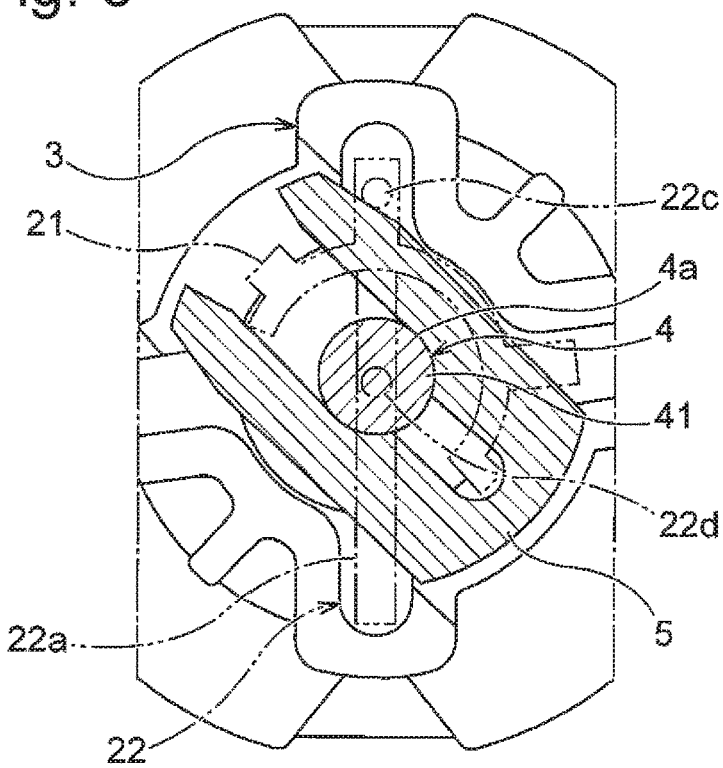
FIG. 6 shows a view illustrating the booster of a braking force according to the first embodiment of the present invention, and is a sectional view taken along line VI-VI of FIG. 2.
Figure 7:
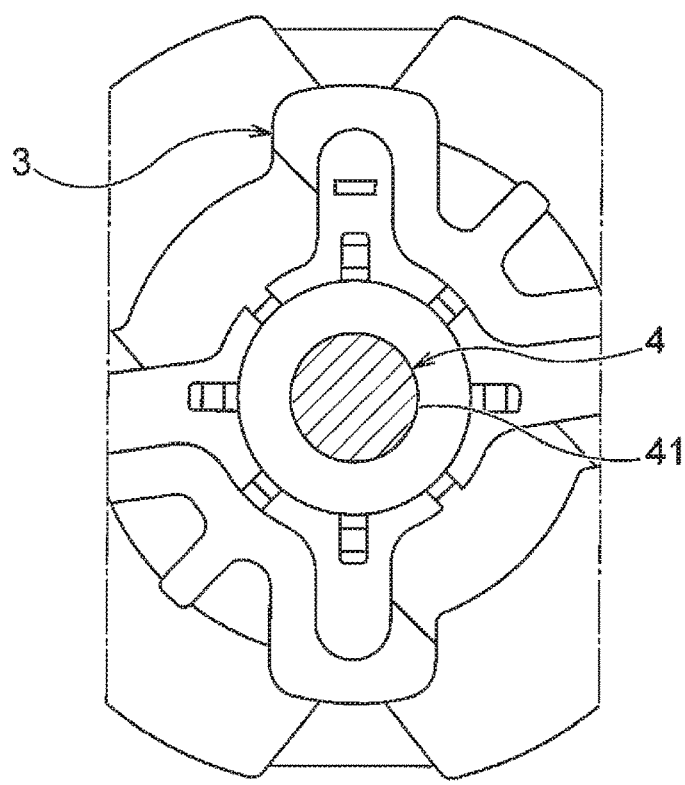
FIG. 7 shows a view illustrating the booster of a braking force according to the first embodiment of the present invention, and is a sectional view taken along line VII-VII of FIG. 2.

Furthermore, the retainer 21 has a substantially semicircular shape illustrated in FIGS. 5 and 6, and is provided considering an assembly properties when the above-described flexible damper 22 is assembled to the input member 4. Therefore, it is also possible to engage the second engaging projected portion 22c by making a part of the control housing 3 protrude as alternative retainer means to the input member 4 side instead of the retainer 21. In addition, in the embodiment, by displacing the flexible damper 22 as the input member 4 is relatively displaced in the axial direction with respect to the retainer 21, the abutting portion 22f exceeds the abutting surface 4b of the input member 4 and protrudes to the right side of the drawing.

In addition, a fulcrum 22g which is folded in a crank shape as an example of a rotation fulcrum being engaged with an edge portion of an axially orthogonal through hole 4c (refer to FIGS. 2 and 5) of the input member 4 is provided in the middle between the first engaging projected portion 22d and the second engaging projected portion 22c in the first arm portion 22a.

Figure 3:
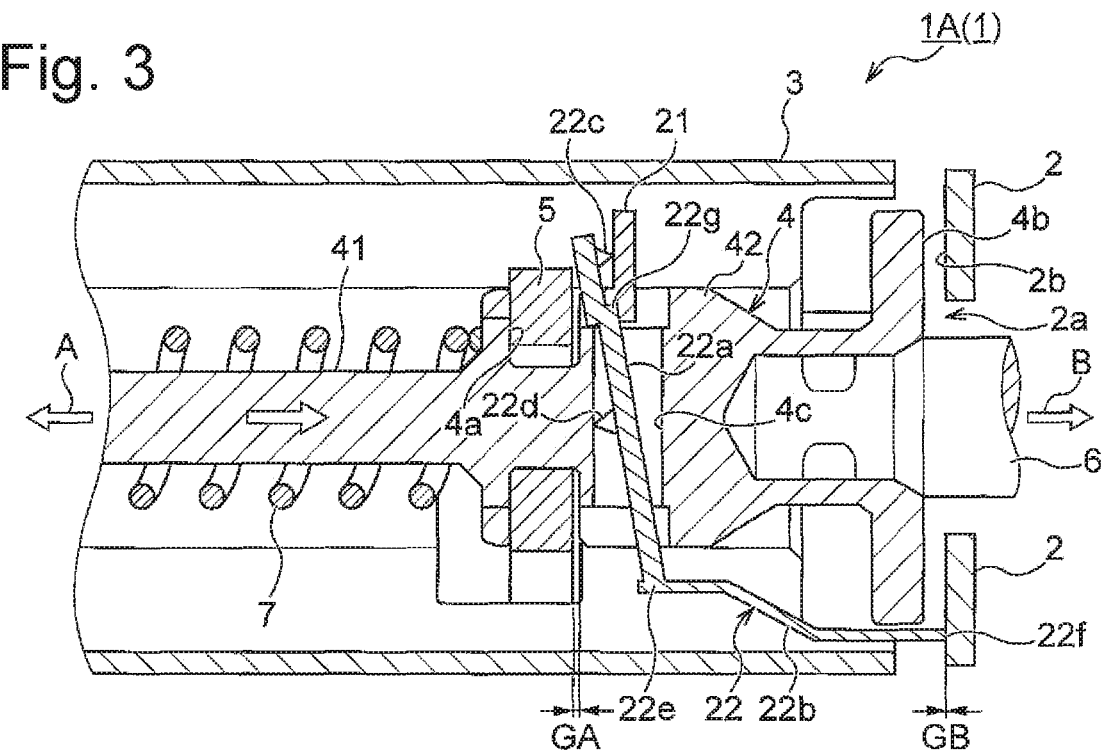
FIG. 3 shows a view illustrating the booster of a braking force according to the first embodiment of the present invention, and is a side sectional view illustrating an operation state of the flexible damper during a return movement of the input member.
Figure 4:
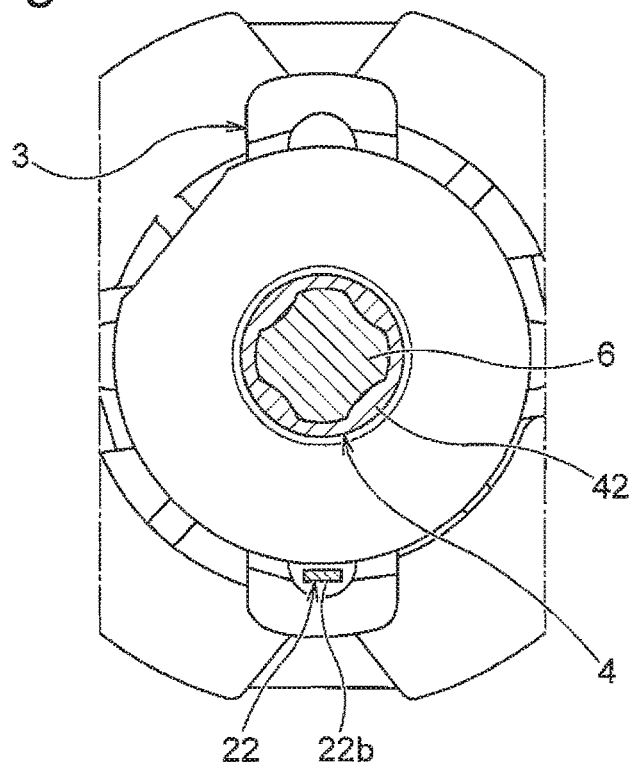
FIG. 4 shows a view illustrating the booster of a braking force according to the first embodiment of the present invention, and is a sectional view taken along line IV-IV of FIG. 2.

(3) Operation State of First Embodiment (Refer to FIGS. 2 and 3)

Next, the operation state of the booster of a braking force 1A according to the first embodiment of the present invention will be described by dividing the operation state into (A) when being in a standby state, (B) when being operated, and (C) when releasing the operation.

When Being in Standby State (Refer to FIG. 2)

When the input member 4 is positioned at a standby position, a state where the input member 4 is positioned on a boundary of rightward movement of FIG. 2 and the abutting surface 4b formed at a right end in the drawing of the linking head 42 of the input member 4 that is movable in the leftward-and-rightward direction abuts against an abutted surface 2b of an inner wall surface of the housing 2, is achieved.

In the state, the first engaging projected portion 22d provided in the intermediate portion of the first arm portion 22a is in a state of abutting against and being engaged with an inner edge portion on the left side in the drawing of the through hole 4c of the input member 4, and the second engaging projected portion 22c provided in the tip portion of the first arm portion 22a is in a state of abutting against and being engaged with the retainer 21.

In addition, the first arm portion 22a is held in an upright posture along the axially orthogonal direction as illustrated in the drawing, the second arm portion 22b extends in the direction perpendicular to the first arm portion 22a considering the bent portion 22e as a center, and a slight axial gap GB is formed between the abutting portion 22f of the tip end and the abutted surface 2b on the left side in the drawing of the housing 2.

When Being Operated (Refer to FIGS. 1 and 2)

When stepping on the brake pedal 100, an operation amount of the brake pedal 100 is transmitted to the input member 4 via the input rod 6, and the input member 4 moves in the first direction A on the left side in FIG. 2. When the input member 4 moves in the first direction A, the movement stroke amount is detected by a sensor which is not illustrated, and accordingly, the motor is driven and moves the booster main body 51 and the control housing 3 in the first direction A which is the same as that of the input member 4 by a predetermined stroke by a rack and pinion mechanism provided with the rack 52 (integrated with the booster main body 51) and the pinion gear 53.

Furthermore, in the state, the first arm portion 22a also maintains the upright posture which is the same as that when being in a standby state, and moves in the first direction A being integrated with the input member 4. In addition, with respect to the output member 9, a stroke amount obtained by combining and boosting the movement stroke amount of the input member 4 and the movement stroke amount of the booster main body 51 is transmitted via the reaction disk 8, and the braking force acts on the wheel by a wheel cylinder by driving the master cylinder by the stroke amount.

When Releasing Operation (Refer to FIG. 3)

When loosening the stepped state of the brake pedal 100 and releasing an operation by separating the foot from the brake pedal 100, the input member 4 moves to return in the second direction B with a great force by the biasing force of the spring 7. In the state, the fulcrum 22g of the first arm portion 22a is engaged with the edge of the through hole 4c of the input member 4, and the first arm portion 22a is rotated in a counterclockwise direction in FIG. 3 using the fulcrum 22g as a rotation fulcrum and is in an inclined posture.

In addition, by the return movement of the input member 4 in the second direction B, as illustrated in FIG. 3, a distance dimension between the retainer 21 and the key 5 is narrower than that when being in a standby state illustrated in FIG. 2. At this time, since the key 5 presses the first engaging projected portion 22d of the first arm portion 22a in the rightward direction in the drawing (arrow B direction), the first arm portion 22a rotates in the counterclockwise direction using the first engaging projected portion 22d as a fulcrum and reaches the position of FIG. 3, and accordingly, the bent portion 22e also moves in the rightward direction (arrow B direction) illustrated in FIG. 3. Similarly, the gap GA becomes slight as illustrated in FIG. 3 due to the rightward movement in the drawing of the key 5.

Accordingly, the tip end abutting portion 22f of the second arm portion 22b of a flexible damper 22 protrudes exceeding the abutting surface 4b of the right end of the input means 4 to the right side in the drawing, and abuts against the abutted surface 2b of the housing 2 in accordance with the flexible or elastic modification, and accordingly, the damping action is given to the return operation of the input member 4. At this time, as illustrated in FIG. 3, the axial gap GB always accurately becomes zero. Next, the abutting surface 4b of the input member 4 comes close to and abuts against the abutted surface 2b of the housing 2 gently without impact due to the damping action of the flexible damper 22. At this time, since the abutting surface 4b and the abutted surface 2b and the nearby portion thereof are rigid bodies which do not have flexibility, the reciprocating stroke of the input member 4 has excellent accuracy in which the variation is not generated.

Therefore, according to the booster of a braking force 1A according to the first embodiment, without deterioration of the detection accuracy of the reciprocating stroke of the input member 4 as illustrated in JP-A-2014-8869 of the related art, it is possible to suppress generation of impact and a hammering sound accompanying the impact as the input member 4 collides with the housing 2 when releasing the operation of the brake pedal 100. In addition, it is possible to prevent a malfunction or an accompanying failure of the ECU by reducing variation of the detection of the reciprocating stroke of the input member 4.

Figure 8:
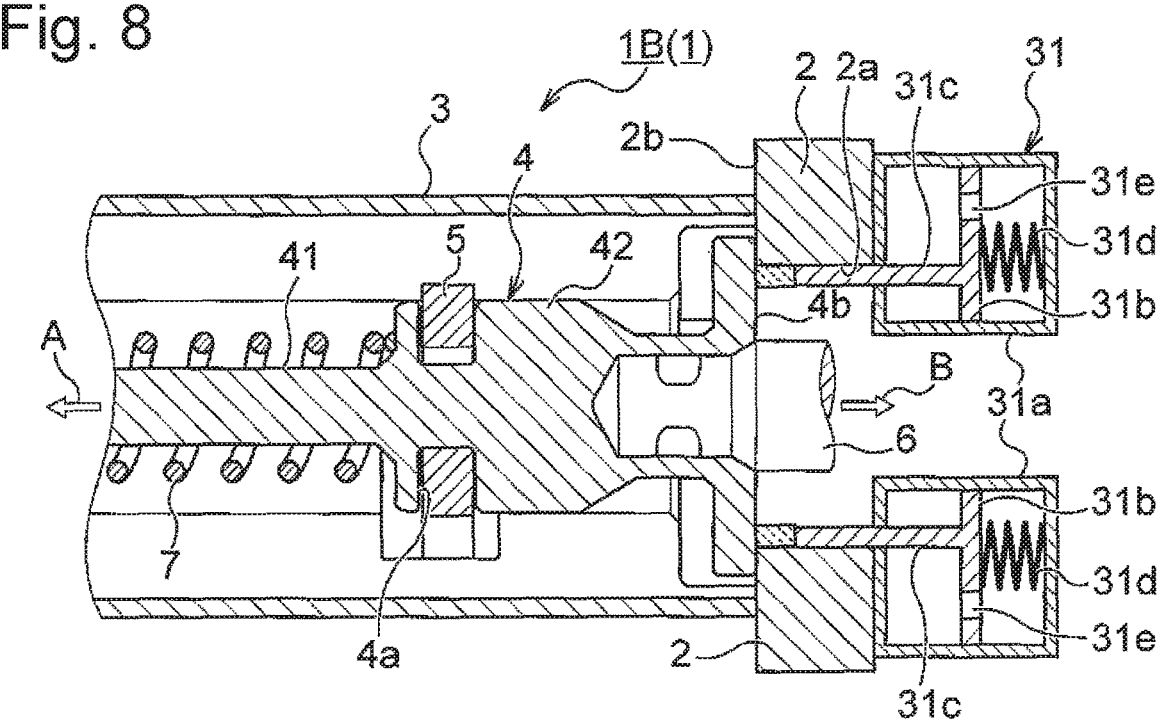
FIG. 8 shows a view illustrating a booster of a braking force according to a second embodiment of the present invention, and is a side sectional view illustrating an operation state of a fluid type damper when the input member is positioned at the standby position.
Figure 9:
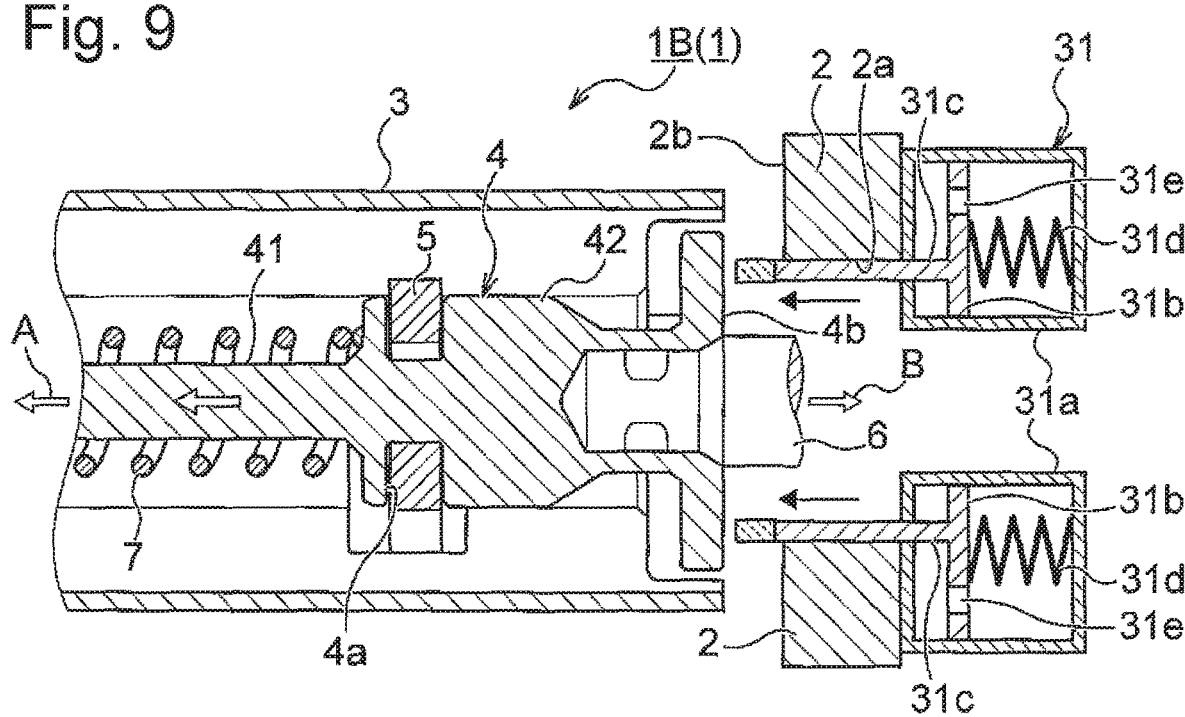
FIG. 9 shows a view illustrating the booster of a braking force according to the second embodiment of the present invention, and is a side sectional view illustrating an operation state of the fluid type damper during an operation of a brake pedal.
Figure 10:
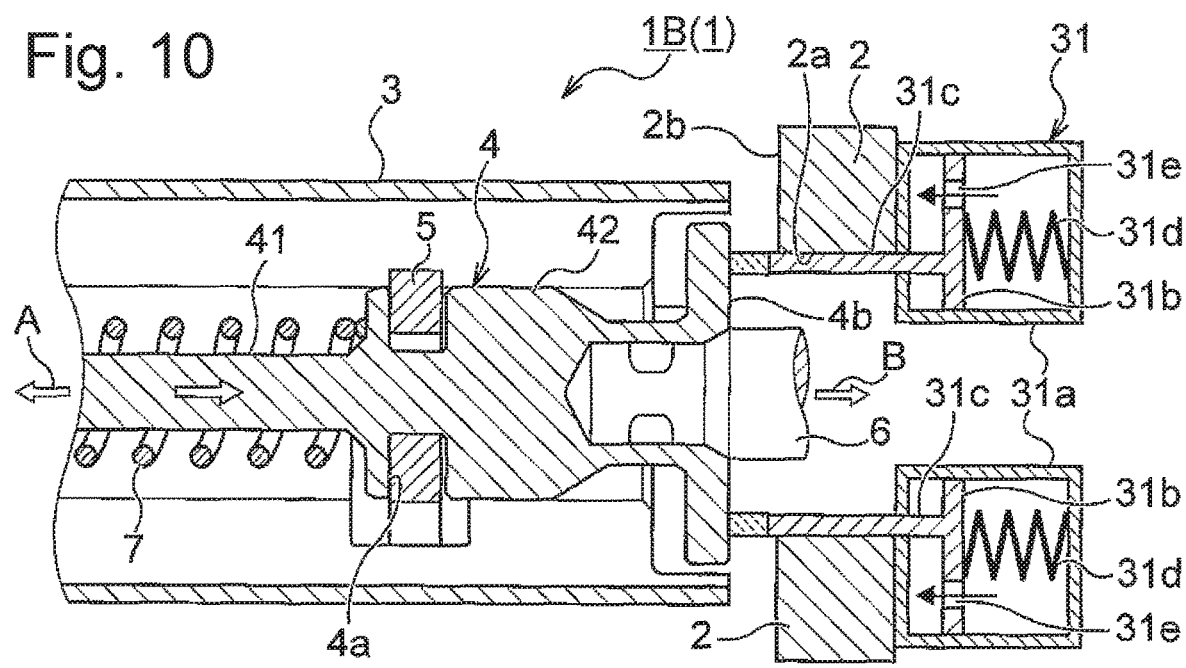
FIG. 10 shows a view illustrating the booster of a braking force according to the second embodiment of the present invention, and is a side sectional view illustrating an operation state of the fluid type damper during the return movement of the input member.

(4) Specific Configuration of Second Embodiment (Refer to FIGS. 8 to 10)

A booster of a braking force 1B according to the second embodiment of the present invention has a configuration similar to that of the first embodiment except for the configuration of the damping member. Therefore, here, the description of the configuration similar to that of the first embodiment will be omitted, and the configuration of the damping member which is different from that of the first embodiment and the operation state thereof will be focused and described.

In other words, in the embodiment, a fluid type damper 31 is provided, and the fluid type damper 31 includes a cylinder 31a in which the damping member is filled with liquid (for example, oil); a flat plate-like piston 31b that is an example which is accommodated in the cylinder 31a, which is provided to be freely slidable in the axial direction, and in which a throttling communication hole 31e is formed at the part thereof; and a sleeve type piston rod 31c in which an end is connected to the piston 31b, in which the other end penetrates one end surface of the cylinder 31a and passes through an opening portion 2a on the brake pedal 100 side of the housing 2, and which extends to the position that opposes the abutting surface 4b of the input member 4.

In addition, in the fluid type damper 31, a spring 31d is installed to contract between the other inner end surface of the cylinder 31a and the piston 31b, and the piston rod 31c is always biased in the protruding direction by the biasing force of the spring 31d.

(5) Operation State of Second Embodiment (Refer to FIGS. 8 to 10)

Next, the operation state of the booster of a braking force 1B according to the second embodiment of the present invention configured in this manner will be described by dividing the operation state into (A) when being in a standby state, (B) when being operated, and (C) when releasing the operation.

When Being in Standby State (Refer to FIG. 8)

When the input member 4 is positioned at a standby position, a state where the input member 4 is positioned on a boundary of rightward movement of FIG. 8 and the abutting surface 4b formed on an end surface on the base end side in the linking head 42 of the input member 4 is in a state of abutting against the abutted surface 2b on the left side of the housing 2.

In addition, the piston 31b in the cylinder 31a is biased in the first direction A by the biasing force of the spring 31d, and the tip end of the piston rod 31c which extends in the first direction A from the piston 31b is in a state of abutting against the abutting surface 4b of the input member 4.

When Being Operated (Refer to FIG. 9)

When the operation is started by stepping on the brake pedal 100, an operation amount of the brake pedal 100 is transmitted to the input member 4 via the input rod 6, and similar to the first embodiment, the booster main body 51 and the control housing 3 are moved in the direction A which is the same as that of the input member 4, and further, the braking force acts on the wheel by moving the output member 9 by a predetermined stroke and by driving the master cylinder.

In the state, the input member 4 and the control housing 3 move to the left side in FIG. 9 by a pressing operation in the first direction A by the input rod 6, and the abutting surface 4b of the input member 4 is separated from the abutted surface 2b of the housing 2. In addition, the piston 31b further moves in the first direction A by a biasing force of the spring 31d and allows the piston rod 31c to protrude until the tip portion of the piston rod 31c reaches an inner space of the housing 2. Furthermore, FIG. 9 is a state where the piston rod 31c moves to the left side until the stroke is sufficient.

When Releasing Operation (Refer to FIG. 10)

When loosening the stepped state of the brake pedal 100 and releasing an operation by separating the foot from the brake pedal 100, the input member 4 moves to return in the second direction B with a great force by the biasing force of the spring 7. In the state, the abutting surface 4b of the input member 4 abuts against the tip portion of the piston rod 31c before abutting against the abutted surface 2b of the housing 2, and acts to push back the piston rod 31 in the second direction B against the biasing force of the spring 31d.

When the piston 31b moves in the second direction B, as illustrated in FIG. 10, the liquid which exists in a right chamber of the piston 31b passes through a throttling communication hole 31e and moves to a left chamber of the piston 31b. In addition, an operation energy of the input member 4 is absorbed by an orifice effect when the liquid passes through the throttling communication hole 31e, and gives a damping effect to the return operation of the input member 4.

In addition, according to the booster of a braking force 1B according to the second embodiment configured in this manner, the action and effects similar to those of the booster of a braking force 1A according to the first embodiment are also achieved.

Figure 11:
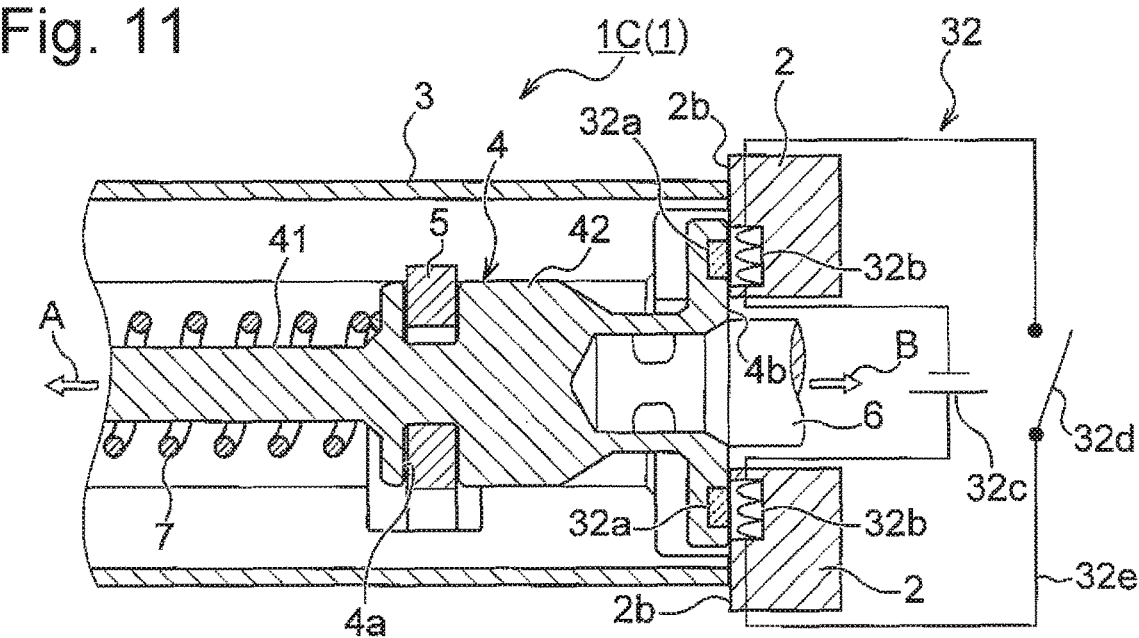
FIG. 11 shows a view illustrating a booster of a braking force according to a third embodiment of the present invention, and is a side sectional view illustrating an operation state of an electromagnetic damper when the input member is positioned at the standby position.
Figure 12:
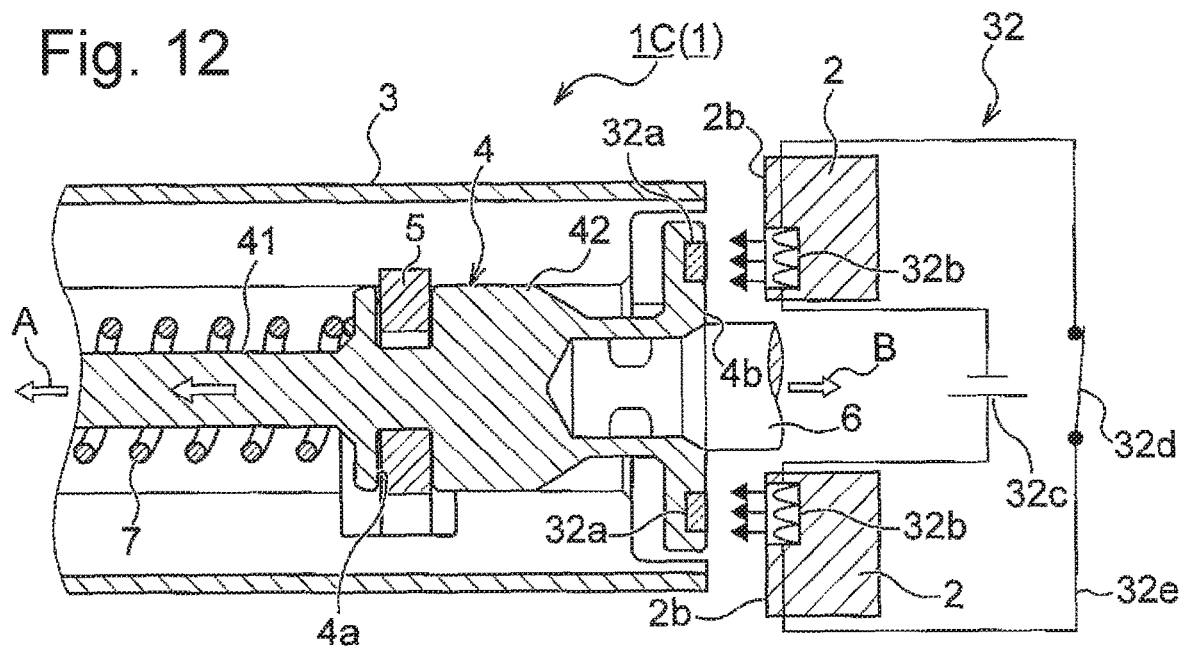
FIG. 12 shows a view illustrating the booster of a braking force according to the third embodiment of the present invention, and is a side sectional view illustrating an operation state of the electromagnetic damper during the operation of the brake pedal.
Figure 13:
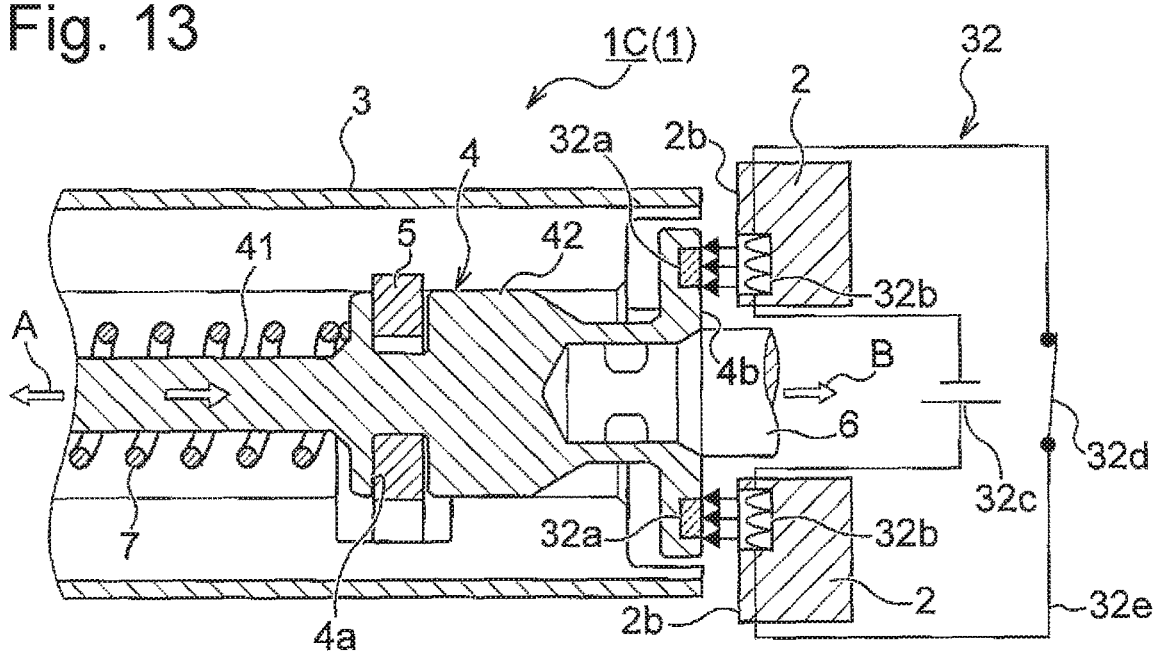
FIG. 13 shows a view illustrating the booster of a braking force according to the third embodiment of the present invention, and is a side sectional view illustrating an operation state of the electromagnetic damper during the return movement of the input member.

(6) Specific Configuration of Third Embodiment (Refer to FIGS. 11 to 13)

A booster of a braking force 1C according to the third embodiment of the present invention has a configuration similar to that of the first embodiment except for the configuration of the damping member. Therefore, here, the description of the configuration similar to that of the first embodiment will be omitted, and the configuration of the damping member which is different from that of the first embodiment and the operation state thereof will be focused and described.

In other words, in the embodiment, the damping member is configured of an electromagnetic damper 32 including a permanent magnet 32a embedded in the abutting surface 4b on the right side of the input member 4, a solenoid 32b embedded in the abutted surface 2b on the left side of the housing 2 at a position which opposes the permanent magnet 32a, a power source 32c which supplies power to the solenoid 32b, a switch 32d which switches ON and OFF the power source 32c, and an electric circuit 32e which connects these members.

(7) Operation State of Third Embodiment (Refer to FIGS. 11 to 13)

Next, the operation state of the booster of a braking force 1C according to the third embodiment of the present invention configured in this manner will be described by dividing the operation state into (A) when being in a standby state, (B) when being operated, and (C) when releasing the operation.

When Being in Standby State (Refer to FIG. 11)

When the input member 4 is positioned at a standby position, a state where the input member 4 is positioned on a boundary of rightward movement of FIG. 11 and the abutting surface 4b on the right side of the linking head 42 of the input member 4 abuts against the abutted surface 2b on the left side of the housing 2, is achieved.

In addition, in the state, the switch 32d is set to be in an OFF state, and the current is not supplied from the power source 32c to the solenoid 32b. Therefore, a magnetic force is not generated between the permanent magnet 32a and the solenoid 32b.

When Being Operated (Refer to FIG. 12)

When stepping on the brake pedal 100, an operation amount of the brake pedal 100 is transmitted to the input member 4 via the input rod 6, and similar to the first embodiment, the booster main body 51 and the control housing 3 are moved in the same direction A integrally with the input member 4, and further, the braking force acts on the wheel by moving the output member 9 by a predetermined stroke and by driving the master cylinder.

In the state, the input member 4 and the control housing 3 move to the left side in FIG. 12 by a pressing operation in the first direction A by the input rod 6, and the abutting surface 4b of the input member 4 is separated from the abutted surface 2b of the housing 2. In addition, the switch 32d is in an ON state, a current is supplied from the power source 32c to the solenoid 32b, and a magnetic force in the reacting direction is generated between the permanent magnet 32a and the solenoid 32b.

When Releasing Operation (Refer to FIG. 13)

When loosening the stepped state of the brake pedal 100 and releasing an operation by separating the foot from the brake pedal 100, the input member 4 moves to return in the second direction B with a great force by the biasing force of the spring 7. In the state, the switch 32d is continuously in an ON state, and when the abutting surface 4b on the right side of the input member 4 abuts against the abutted surface 2b on the left side of the housing 2, the damping action is given to the return operation of the input member 4 by the reaction action by the magnetic force of the permanent magnet 32a the solenoid 32b, the return movement speed of the input member 4 is decelerated, and the impact force is weakened.

Therefore, according to the booster of a braking force 1C according to the third embodiment, the action and effects similar to those of the booster of a braking force 1A according to the first embodiment are also achieved. Furthermore, in the embodiment, since it is possible to control a switching operation of ON and OFF of the switch 32d and the size of the magnetic force by adjusting the size of the current supplied to the solenoid 32b, it is possible to gradually weaken the magnetic force as the abutting surface 4b of the input member 4 comes close to the abutted surface 2b of the housing 2, and it is also possible to control the magnetic force to be 0 in a state where the switch 32d is in the OFF state at a timing at which the abutting surface 4b abuts against the abutted surface 2b.

(7) Other Embodiments

Basic embodiments of the present invention are described above, but the booster of a braking force 1 of the present invention is not limited to the above-described embodiments, and it is possible to change or omit a partial configuration within a range that does not depart from the idea of the present invention, or to add the technology that is already known and is commonly used.

For example, instead of the flexible damper 22 (FIG. 2) employed in the first embodiment, it is possible to employ a mechanical damper configured of a ring mechanism or the like that achieves the action similar to that of the flexible damper 22. In addition, it is also possible to employ the fluid type damper 31 which uses an air pressure instead of the fluid type damper 31 (FIG. 8) that uses a hydraulic pressure employed in the second embodiment. In addition, by reversing the disposition of the permanent magnet 32a and the solenoid 32b of the electromagnetic damper 32 (FIG. 11) employed in the third embodiment, it is also possible to employ a configuration in which the solenoid 32b is disposed on the input member 4 side and the permanent magnet 32a is disposed on the housing 2 side, respectively.

REFERENCE SIGNS LIST

1 BOOSTER OF BRAKING FORCE
2 HOUSING
2a OPENING PORTION
2b ABUTTED SURFACE
3 CONTROL HOUSING
3a FIRST MESHING PORTION
4 INPUT MEMBER
4a GROOVE PORTION
4b ABUTTING SURFACE
4c THROUGH HOLE
5 KEY
6 INPUT ROD
7 SPRING
8 REACTION DISK
9 OUTPUT MEMBER
10 COVER
11 SPRING
21 RETAINER
22 FLEXIBLE DAMPER
22a FIRST ARM PORTION
22b SECOND ARM PORTION
22c SECOND ENGAGING PROJECTED PORTION
22d FIRST ENGAGING PROJECTED PORTION
22e BENT PORTION
22f ABUTTING PORTION
22g FULCRUM
31 FLUID TYPE DAMPER
31a CYLINDER
31b PISTON

31c PISTON ROD
31d SPRING
31e THROTTLING COMMUNICATION HOLE
32 ELECTROMAGNETIC DAMPER
32a PERMANENT MAGNET
32b SOLENOID
32c POWER SOURCE
32d SWITCH
32e ELECTRIC CIRCUIT
41 PLUNGER
42 LINKING HEAD
51 BOOSTER MAIN BODY
52 RACK
53 PINION GEAR
100 BRAKE PEDAL
GA GAP
GB GAP
A FIRST DIRECTION
B SECOND DIRECTION

The invention claimed is:

1. A booster of a braking force which drives a master cylinder by boosting an operation force of a brake pedal (100) in accordance with a movement amount of an input member (4) that reciprocates by an operation of the brake pedal (100), the booster comprising:
the input member (4), one end of which is linked to the brake pedal (100), which is inserted and fitted to the inside of a control housing (3) installed in a main housing (2), and which is provided to be freely relatively slidable in an axial direction; and
a damping member (22, 31, 32) which is provided at a predetermined position to absorb and damp impact of abutting against the housing when the input member (4) moves to return in the axial direction,
wherein the input member (4) abuts against the main housing (2) in a state where the brake pedal (100) is not operated, and
wherein, after the input member (4) is moved in a first direction (A) by the operation of the brake pedal (100), when the input member (4) moves to return in a second direction (B) which is reverse to the first direction (A) by a biasing force of a spring (7) provided in the control housing (3) by releasing the operation of the brake pedal (100) so as to abut against the main housing (2), the damping member (22, 31, 32) absorbs and damps impact when the input member (4) abuts against the main housing (2),
wherein the damping member is configured of a flexible damper (22) including a bent portion (22e) that is bent or rotates, a first arm portion (22a) that extends to penetrate the input member (4) in an axially orthogonal direction from the bent portion (22e), and a second arm portion (22b) which extends along the axial direction of the input member (4) from the bent portion (22e).

2. The booster of a braking force (1) according to claim 1,
wherein a first engaging portion (22d) engaged with a part of the input member (4) is provided in an intermediate portion of the first arm portion (22a), and a second engaging portion (22c) engaged with a retainer member (21) provided at a part of the control housing (3) or in the control housing (3) is provided in a tip portion of the first arm portion (22a), and
wherein an abutting portion (22f) which exceeds an abutting surface (4b) of the input member (4) by a lever ratio of the first arm portion (22a) and the second arm portion (22b) and protrudes to the main housing (2) side when a relative displacement is generated between the input member (4) and the control housing (3), is provided in a tip portion of the second arm portion (22b).

3. The booster of a braking force (1) according to claim 2,
wherein a fulcrum (22g) which is a rotation fulcrum and is engaged with an inner edge portion of an axially orthogonal through hole (4c) formed in the input member (4) is provided in the middle between the first engaging portion (22d) and the second engaging portion (22c) in the first arm portion (22b).

4. A booster of a braking force which drives a master cylinder by boosting an operation force of a brake pedal (100) in accordance with a movement amount of an input member (4) that reciprocates by an operation of the brake pedal (100), the booster comprising:
the input member (4), one end of which is linked to the brake pedal (100), which is inserted and fitted to the inside of a control housing (3) installed in a main housing (2), and which is provided to be freely relatively slidable in an axial direction; and
a flexible damper (22) including a bent portion (22e) that is bent or rotates, a first arm portion (22a) that penetrates the input member (4) in an axially orthogonal direction from the bent portion (22e) and extends to be displaceable, and a second arm portion (22b) which extends along the axial direction of the input member (4) from the bent portion (22e), as a damping member provided in a state of being linked to a part of the input member (4),
wherein, after the input member (4) is moved in a first direction (A) by the operation of the brake pedal (100) and gives a braking force to a wheel, when the input member (4) moves to return in a second direction (B) which is reverse to the first direction (A) by a biasing force of a spring (7) by releasing the operation of the brake pedal (100) so as to abut against the main housing (2), the damping member (22) absorbs and damps impact when the input member (4) abuts against the main housing (2).

5. The booster of a braking force (1) according to claim 4,
wherein a first engaging portion (22d) engaged with a part of the input member (4) is provided in an intermediate portion of the first arm portion (22a), and a second engaging portion (22c) engaged with a retainer member (21) provided at a part of the control housing (3) or in the control housing (3) is provided in a tip portion of the first arm portion (22a), and
wherein an abutting portion (22f) which exceeds an abutting surface (4b) of the input member (4) by a lever ratio of the first arm portion (22a) and the second arm portion (22b) and protrudes to the main housing (2) direction when a relative displacement is generated between the input member (4) and the control housing (3), is provided in a tip portion of the second arm portion (22b).

6. The booster of a braking force (1) according to claim 5,
wherein a fulcrum (22g) which is a rotation fulcrum and is engaged with an edge of a through hole (4c) formed in the input member (4) is provided in the middle between the first engaging portion (21d) and the second engaging portion (22c) in the first arm portion (22a).

7. A booster of a braking force which drives a master cylinder by boosting an operation force of a brake pedal (100) in accordance with a movement amount of an input member (4) that reciprocates by an operation of the brake pedal (100), the booster comprising:

the input member (4), one end of which is linked to the brake pedal (100), which is inserted and fitted to the inside of a control housing (3) installed in a main housing (2), and which is provided to be freely relatively slidable in an axial direction; and a liquid type damper (31) including a cylinder (31a) which is filled with liquid, a piston (31b) which is accommodated in the cylinder (31a), which is provided to be freely slidable in the axial direction, and in which a throttling communication hole (31e) is formed at a part thereof, and a sleeve-like piston rod (31c) of which one end is connected to the piston (31b), and of which the other end passes through one end surface of the cylinder (31a) and extends to a position that opposes an abutting surface (4b) of the input member (4) through an opening portion (2a) of the main housing (2), as a damping member provided at a position which can abut against the input member (4), wherein, after the input member (4) is moved in a first direction (A) by the operation of the brake pedal (100) and gives a braking force to a wheel, when the input member (4) moves to return in a second direction (B) which is reverse to the first direction (A) by a biasing force of a spring (7) provided in the control housing (3) by releasing the operation of the brake pedal (100) so as to abut against the main housing (2), the fluid type damper (31) absorbs and damps impact when the input member (4) abuts against the main housing (2).

8. The booster of a braking force (1) according to claim 7, wherein a spring (31d) which is provided between the other end surface of the cylinder (31a) and the piston (31b) and which always biases the piston rod (31c) in a protruding direction, is provided in the fluid type damper (31).

9. A booster of a braking force which drives a master cylinder by boosting an operation force of a brake pedal (100) in accordance with a movement amount of an input member (4) that reciprocates by an operation of the brake pedal (100), the booster comprising:

the input member (4), one end of which is linked to the brake pedal (100), which is inserted and fitted to the inside of a control housing (3) installed in a main housing (2), and which is provided to be freely relatively slidable in an axial direction; and an electromagnetic damper (32) including a permanent magnet (32a) embedded in an abutting surface (4b) of the input member (4), a solenoid (32b) embedded in an abutted surface (2b) of the main housing (2) at a position which opposes the permanent magnet (32a), a power source (32c) which supplies power to the solenoid (32b), a switch (32d) which switches ON and OFF the power source, and an electric circuit (32e) which connects the solenoid (32b), the power source (32c), and the switch (32d), as a damping member provided at a part at which the input member (4) and the main housing (2) abut against each other, wherein a magnetic force is not generated between the permanent magnet (32a) and the solenoid (32b) by turning OFF the switch (32d) in a standby state where the brake pedal (100) is not operated, wherein the magnetic force in a reacting direction is generated between the permanent magnet (32a) and the solenoid (32b) by turning ON the switch (32d) during an operation of operating the brake pedal (100) and during an operation releasing of releasing the operation of the brake pedal (100), and wherein, after the input member (4) is moved in a first direction (A) by the operation of the brake pedal (100) and gives a braking force to a wheel, when the input member (4) moves to return in a second direction (B) which is reverse to the first direction (A) by a biasing force of a spring (7) provided in the control housing (3) by releasing the operation of the brake pedal (100) so as to abut against the main housing (2), the electromagnetic damper (32) absorbs and damps impact when the input member (4) abuts against the main housing (2).

* * * * *